(12) United States Patent
Tognazzini

(10) Patent No.: US 6,195,420 B1
(45) Date of Patent: *Feb. 27, 2001

(54) HOTEL CHECK-OUT SYSTEM

(75) Inventor: Bruce Tognazzini, Woodside, CA (US)

(73) Assignee: Sun Microsystems, Inc., Mountain View, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/670,926

(22) Filed: Jun. 26, 1996

(51) Int. Cl.$^7$ ...................................................... H04M 15/00
(52) U.S. Cl. .................. 379/130; 379/93.23; 379/93.12; 379/112; 379/119
(58) Field of Search ..................................... 379/130, 157, 379/158, 267, 268, 308, 321, 357, 419, 434, 93.01, 93.09, 93.11, 93.12, 93.14, 93.17, 93.21, 93.23, 93.25, 110.01, 116, 119; 455/403, 405; 345/331, 332, 333, 334, 335, 356, 357

(56) References Cited

U.S. PATENT DOCUMENTS

| | | | |
|---|---|---|---|
| 3,675,204 | * | 7/1972 | Miehle et al. . |
| 4,072,825 | * | 2/1978 | McLay et al. . |
| 4,953,159 | * | 8/1990 | Hayden et al. ....................... 379/204 |
| 5,365,577 | * | 11/1994 | Davis et al. ............................ 379/96 |
| 5,475,740 | * | 12/1995 | Biggs, Jr. et al. ...................... 379/91 |
| 5,515,491 | * | 5/1996 | Bates et al. ........................... 395/155 |
| 5,606,496 | * | 2/1997 | D'Agostino .......................... 395/235 |
| 5,614,703 | * | 3/1997 | Martin et al. ........................ 235/382 |
| 5,633,920 | * | 5/1997 | Kikinis et al. ....................... 379/130 |
| 5,742,670 | * | 4/1998 | Bennett ................................. 379/142 |
| 5,846,263 | * | 12/1998 | Camaisa et al. ....................... 705/27 |
| 6,006,282 | * | 12/1999 | DeLeeuw et al. ....................... 710/5 |

* cited by examiner

Primary Examiner—Curtis A. Kuntz
Assistant Examiner—Binh K. Tieu
(74) Attorney, Agent, or Firm—McDermott, Will & Emery

(57) ABSTRACT

Specialized computer terminals with a telephone, touch screen and magnetic stripe reader are used to access a customer's bill from various locations within a hotel, such as a restaurant and bar. When checking out a customer can review the bill and can be automatically linked to a customer service representative (CSR) over voice and data links. Groupware permits the customer and CSR to cooperatively review the same version of the bill on their respective terminals and resolve any disputes.

22 Claims, 6 Drawing Sheets

HOTEL CHECK-OUT SYSTEM

BACKGROUND OF THE INVENTION

1. Field of the Invention

The invention relates to communication systems, and more particularly, to specialized communications systems for use in reviewing invoices and then resolving disputes concerning those invoices.

2. Description of Related Art

In-room video checkout systems offered by many hotels permit a guest to view his bill and authorize payment. However, these systems provide no way to easily resolve billing disputes except by visiting the cashier.

Some hotels prepare a final bill during the night before a quest's departure and slip it under the door. If there is a problem with the pre-printed bill prepared during the night, such as an error or omission, the guest is faced with having to wait in line to speak with a cashier to resolve it. As the cashier and the guest attempt to solve the problem there are many opportunities for miscommunication between them: while the guest is looking at a paper copy of the bill, the cashier is typically looking at a computer screen which has formatted the bill information differently, so substantial verbal effort may be required to, in effect, map the format seen by the guest to the format seen by the cashier so that each knows what the other is talking about.

Guests checking out of hotels often face a dilemma. Should they skip breakfast so that they can check out quickly using the pre-printed bill slipped under the door during the night or should they eat breakfast and then have to go through the entire bill preparation process again? A guest may opt to skip having breakfast at the hotel to avoid spending time at the cashier's counter as the bill is prepared again. Not only has the traveler skipped a meal, but the hotel has missed an opportunity to generate revenue due to the loss of a restaurant customer.

Touch screens, where human/machine interaction is achieved by literally touching a desired icon or portion of the screen, are extremely easy to use and often eliminate the need for any other sort of input device.

Radio or radio telephony, whether digital or analog, eliminate the needs for "hard-wired" connections and enable, individually or simultaneously, two-way voice and data communications.

Collaborative software tools, which allow multiple users to view, annotate, and change documents while interacting with other users, are commercially available. This technology, in conjunction with telecommunication networks, allows users from disparate locations to interact as if they were physically in the same location. Each user's display contains the same information as all the other users' devices. As a result, little of the cognitive dissonance that may occur, for example, during a telephone conference call where one user is trying to describe an object to others does occur. Such collaborative tools are often referred to as groupware.

SUMMARY OF THE INVENTION

The invention provides apparatus, system, methods and computer program products which allow a hotel guest increased flexibility in determining when the bill is prepared and how disputes over errors or omissions are resolved.

Conceptually, the invention provides the guest with instant access to his current bill, the ability to add, for example, a tip to a restaurant bill that has not yet been completed, and immediate access, via telephone and groupware, to the hotel's cashier to resolve disputes. In addition, the customer can authorize payment of the bill and receive a printed copy of the bill on demand without the intervention of a cashier.

The invention uses three different communications approaches. In one form, the invention uses radio telephony to allow the guest to review his bill, add a tip to a restaurant check, request that the bill be printed for later pick-up, authorize payment and, if necessary, speak to the cashier. A second embodiment, with all the functionality of the first, uses a wired approach to data and voice transmission. A third embodiment (also wired), again with all the functionality described above, is implemented in a kiosk where a guest can request an immediate printout of the guest's bill on a printer located within the kiosk.

This invention solves problems with current hotel billing and checkout procedures by empowering the guest to determine when his bill should be generated, by encouraging close and easy cooperation between the guest and the cashier should there be a billing dispute, and by allowing the guest to quickly authorize bill payment and print his final bill without having to wait for a cashier.

The inventions relates to apparatus for allowing a user to communicate with a customer service representative, including a telephone handset, a computer, having a display, configured to retrieve a user's account information, display it for the user and permit a customer service representative to see the same display information as that viewed by the user, a card reader, and an interface connecting the telephone handset, the computer and the card reader to a network. The interface connects the telephone handset to one of a cellular telephone, cordless telephone or a radio transceiver. The interface connect audio information from the telephone handset and data from the computer to a voice/data multiplexer for transmission over the network.

The inventions also relates to a method of allowing a user to communicate with a customer service representative about a bill, including the steps of reading an account identification from a medium, retrieving account information using the account identification and displaying the account information on a display of the user and on a display of the customer service representative, and activating a voice link to the customer service representative. The account information can be revised during discussions between the user and the customer service representative and the revised information stored.

The invention also relates to a method of allowing a user to communicate with a customer service representative, by reading account identification information from a recording medium, accessing a database to retrieve account information based on the account identification information, and linking a terminal of the customer service representative and a terminal of the user to display the same information. A voice link is established between the user and the customer service representative.

The invention also relates to a system for allowing a user to communicate with a customer service representative, including a network, a customer service representative terminal providing voice and data links to the network, a database accessible over the network, and one or more user terminals each providing a voice and data link to the network and each having a computer and card reader. The computer is configured to obtain account identification from the card reader and connect the user to the database to retrieve account information. The link to the network can be over a cellular telephone link, a cordless telephone link, or a radio link. One of terminals is installed in a kiosk. The network may be an integrated voice and data PBX.

Computer program products permit implementing the methods, apparatus and systems of the invention on one or more computers.

Still other objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

The object, features and advantages of the system of the present invention will be apparent from the following description, in which.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Figure 1:
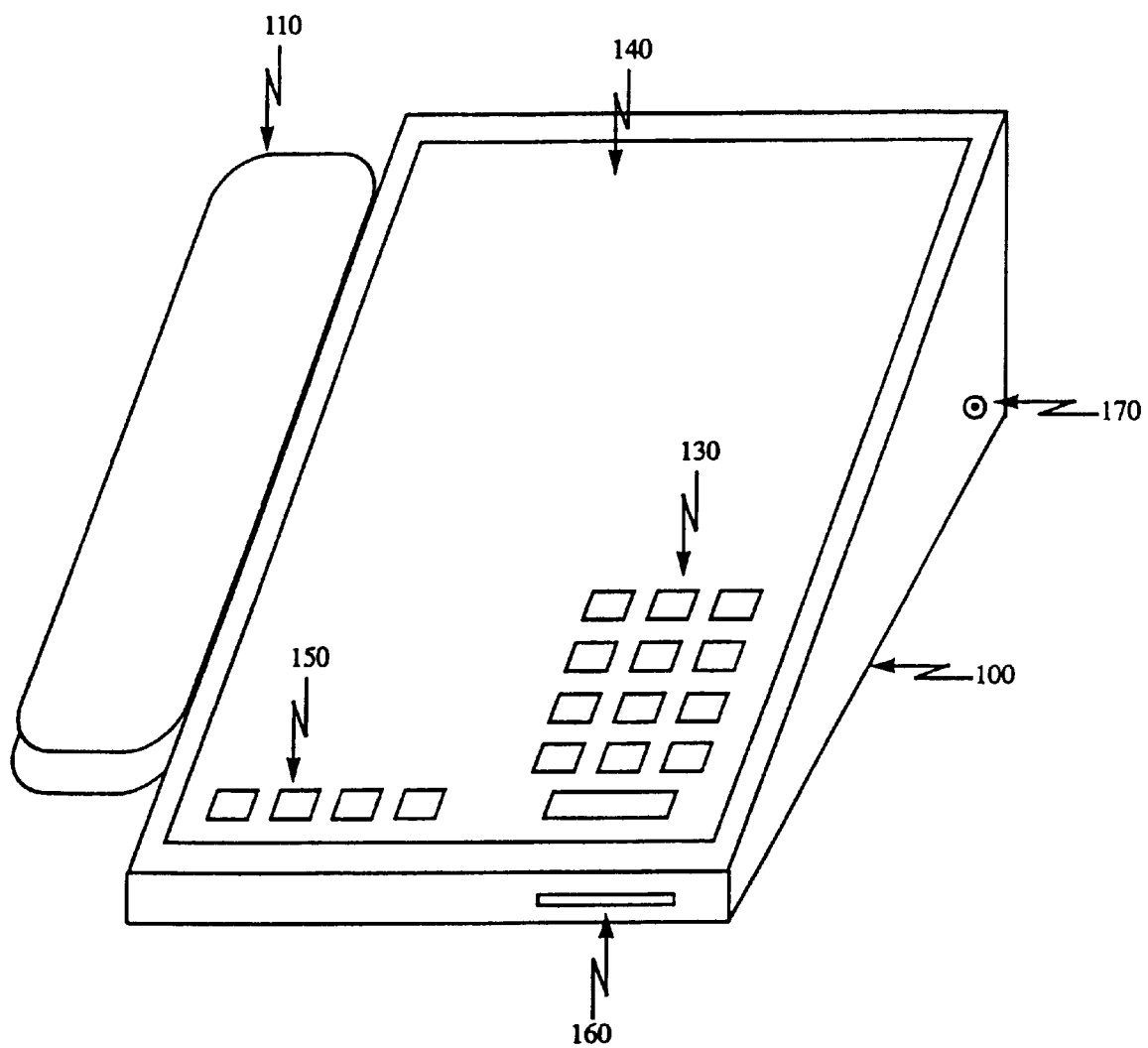
FIG. 1 is a perspective view of an exemplary table top customer unit (terminal) for use in accordance with the invention.

An exemplary table top customer unit or terminal is illustrated in FIG. 1. This terminal is used to prepare the final hotel bill, authorize payment, and request a printed copy of the bill. It may be used with a wireless (radio or radio telephone) communications link or with a wired telephone connection depending on where it is installed. The terminal consists of a cabinet (100) which houses the internal components and, on one face, the touch-screen display (140). The left side of cabinet illustrated provides a cradle for a telephone handset (110). On the front of the cabinet is a magnetic stripe reader (160) where a guest would insert his room key, which has an encoded magnetic stripe, to activate the display. In addition, a plug (170) is shown to allow for the recharging of an internal power source useful when a nearby connection to house power is not available.

The display screen (140) in FIG. 1 is shown configured with user control buttons (150) and a user input numeric keypad (130). By using a touch screen display the buttons and keypad need not necessarily be physical devices, but may be merely icons which the user presses as he would actual buttons. The advantage to these iconic buttons is that they can be easily modified in the software of the invention in response to needed changes or enhancements in the invention's functionality.

Once the guest has inserted his key into the slot (160) the apparatus would retrieve and display his current bill. If needed, the guest would pick up the telephone (110) and be connected to a cashier to resolve billing problems. When the key is removed, the current display is erased and instruction on how to activate the unit are displayed.

Figure 2:
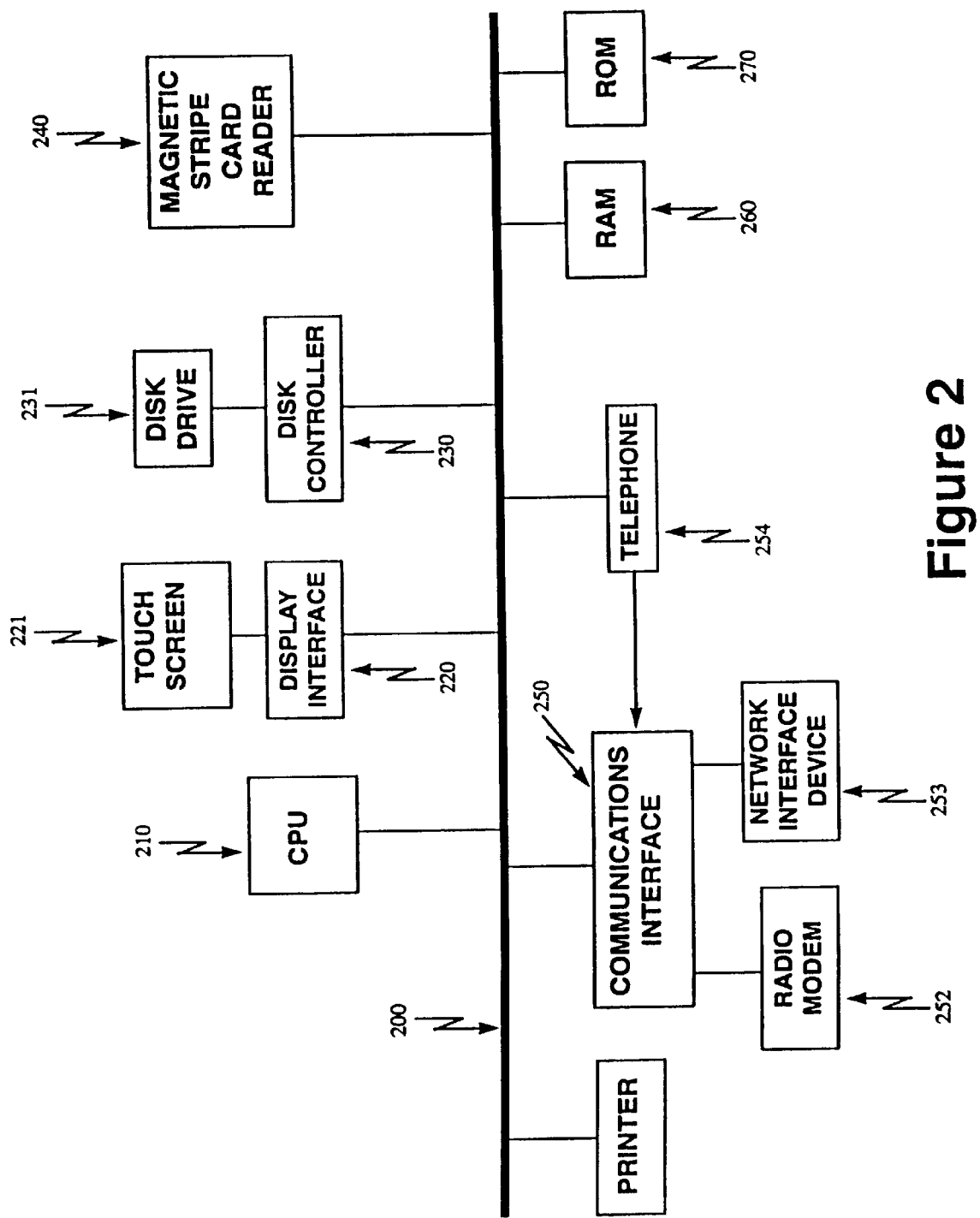
FIG. 2 is an exemplary block diagram of a unit of the type shown in FIG. 1.

FIG. 2 is an exemplary block diagram of a unit of the type shown in FIG. 1. The bus (200) allows the microprocessor (210) to retrieve programming instructions from memory (260, 270) and to read from and write data to memory. If the storage requirements are substantial, the microprocessor can retrieve information via a disk controller (230) from one or more disk drive (231). The memory media used in the disk drives may also carry data and software for programming the various devices used to carry out the invention. The information encoded on the magnetic stripe on the guest's room key is read by the card reader (240), and is then utilized by the microprocessor to initiate the process of transferring data from the hotel's computer system (e.g. server) to the customer unit using the communication interface (250). The appropriate communication device (252 or 253) is selected based upon the desired type of installation. When the guest lifts the telephone handset the microprocessor initiates a voice telephone call to the cashier. A customer's choices on the display are communicated to the display interface (220) which, in turn, passes selected information to the microprocessor for interpretation.

Figure 3:
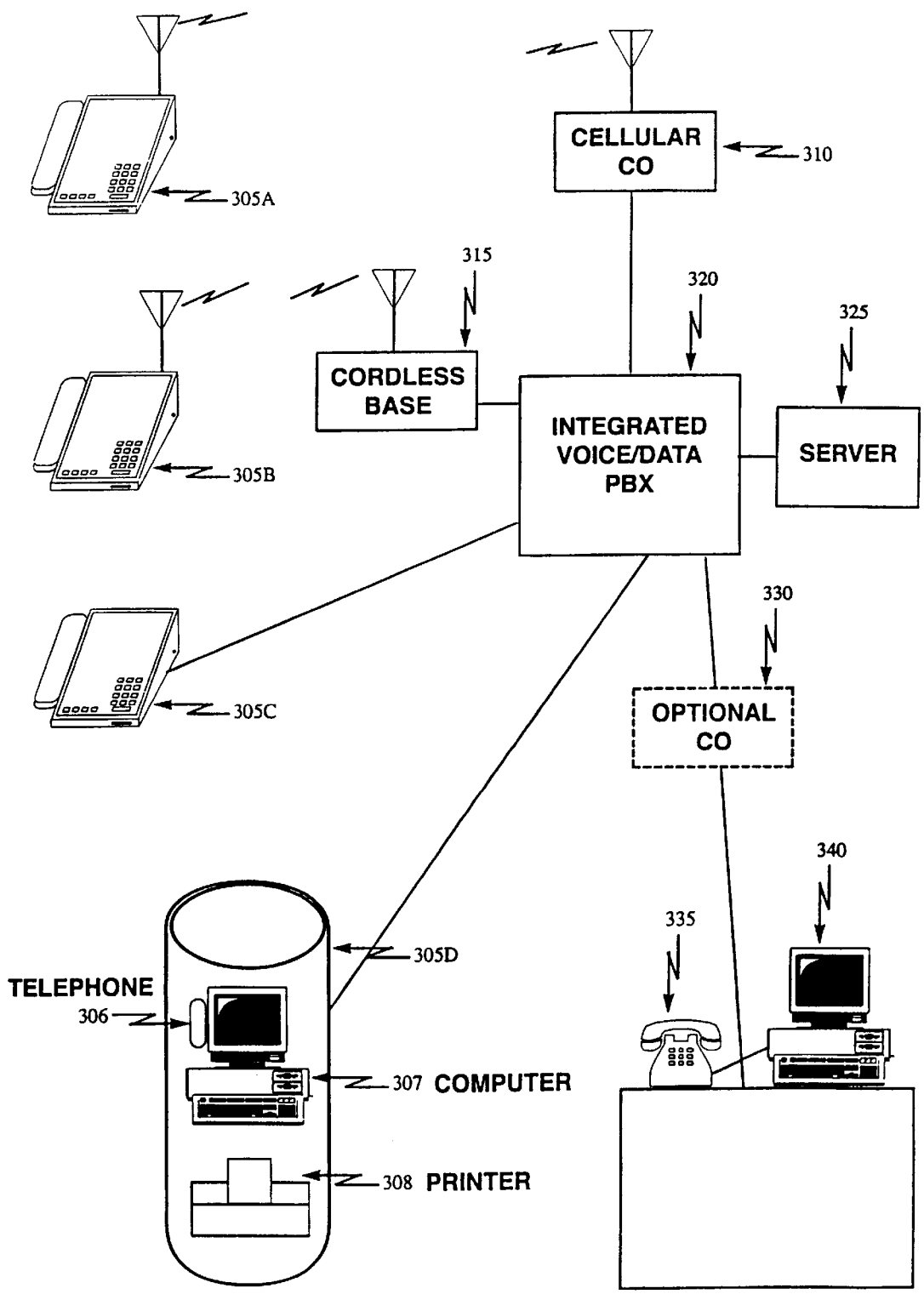
FIG. 3 is a block diagram of an exemplary integrated system for linking terminals of the type shown in FIG. 1 for carrying out the invention.

FIG. 3 is a block diagram of an exemplary system for carrying out the invention.

Terminal 305A is a terminal of the type shown in FIGS. 1 and 2 equipped for communication over a cellular telephone link to a telephone central office 310. From there the call is routed to integrated voice/data PBX 320. Terminal 305B is a terminal of the type shown in FIGS. 1 and 2, however equipped with a cordless telephone link between the table top unit 305B and a cordless base station 315. It is connected to the integrated voice line state of PBX 320. Terminal 305C is also a terminal unit of the type shown in FIGS. 1 and 2, however, this terminal is hardwired to the integrated voice/data PBX 320. Terminal 305D is a kiosk version of the terminal unit shown in FIGS. 1 and 2. Terminal 305D has a telephone 306, a computer 307, links to communicate voice and data to and from the integrated voice/data PBX 320. In addition, the kiosk is equipped with a printer 308 for printing out bills locally at the request of the customer using the kiosk.

Server 325 maintains the billing data base for the hotel or other business. It, too, connects to integrated voice/data PBX 320 and can be accessed by the individual terminals or by the customer service representative at the front desk. The customer service representative's workstation is illustrated in FIG. 3 with a telephone 335 and with a computer 340 connected to the integrated voice/data PBX network 320 over a voice and data link. Optionally, the voice and data link may be routed through intermediate central offices 330, indicating, that the customer service representative may be located remotely from the site of the customer's principal activities.

Figure 4:
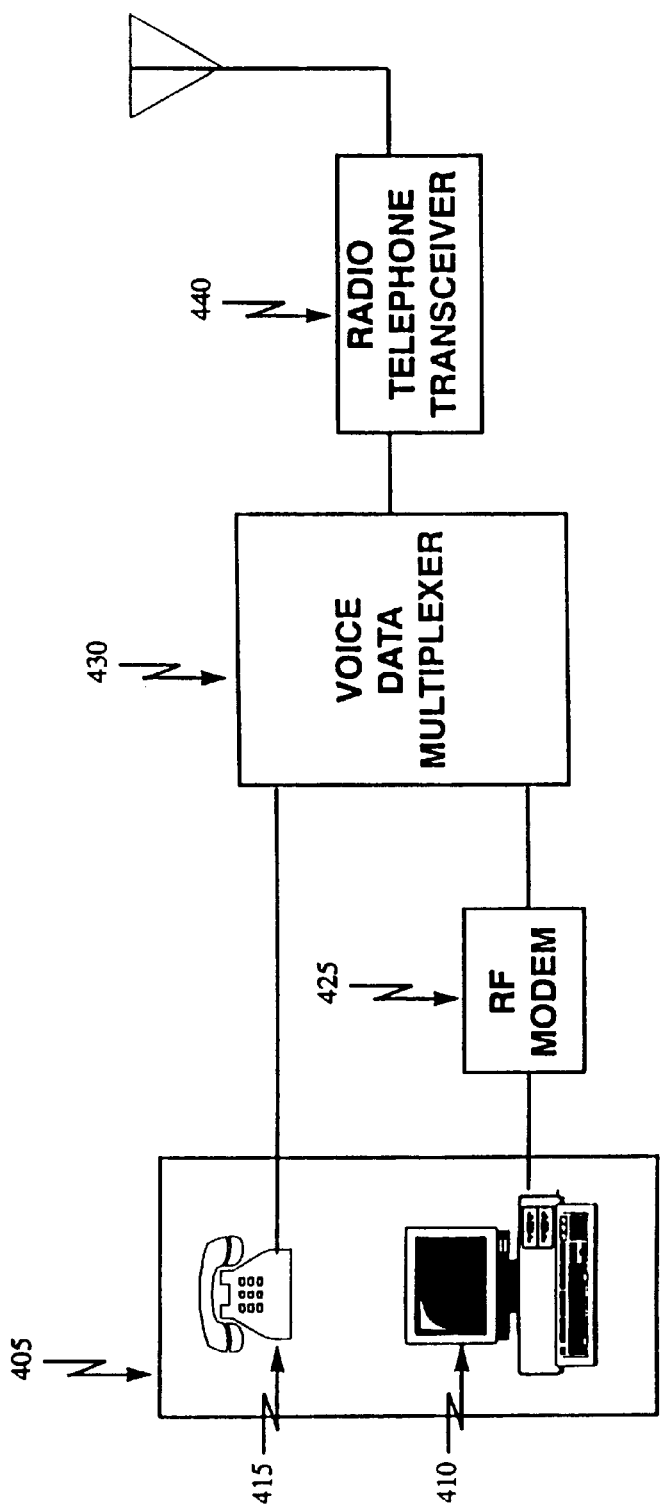
FIG. 4 is a block diagram of a radio telephone link for connecting a customer unit to an integrated voice-data PBX.

FIG. 4 is a block diagram of a radio telephone link for connecting a customer unit to an integrated voice data PBX. The customer unit 405, such as that illustrated in FIGS. 1 and 2, comprises a telephone 415 and a computer 410. The audio portion from the customer unit 405 is connected to one input port of voice data multiplexer 430 and the data from computer 410 is connected to another port. Voice and data are combined in such a way as to permit them to be demultiplexed at the other end of the radio link. Radio telephone transceiver 440 may be either a cellular telephone transceiver or a cordless telephone transceiver. An RF modem is very similar to a data modem except for that certain settings and provisions are made to be more tolerate of RF link fade such as Rayleigh fading.

Figure 5:
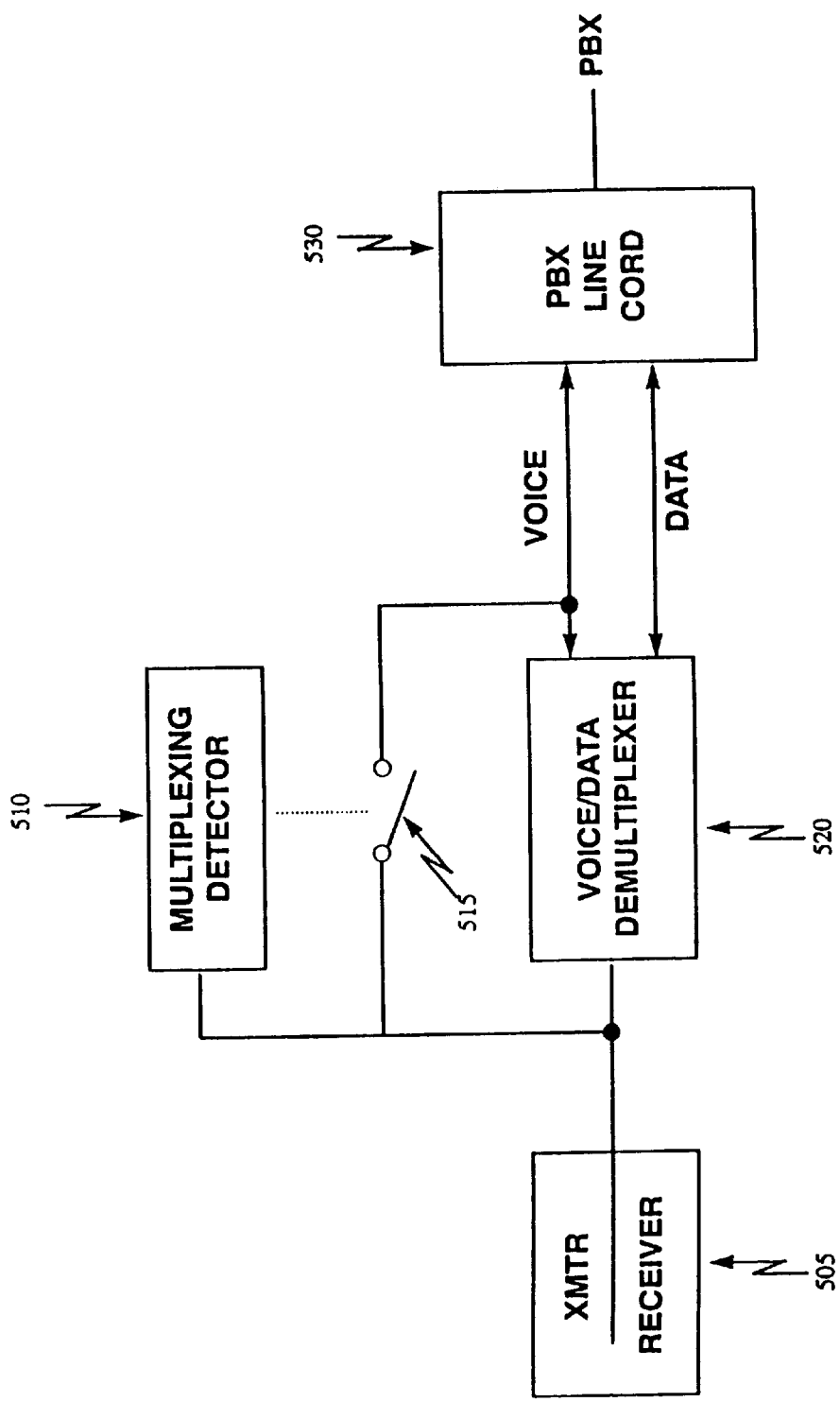
FIG. 5 is a block diagram of a network interface for connecting a radio link receiver to an integrated voice-data PBX line card.

FIG. 5 is a block diagram of a network interface for connecting a radio link to an integrated voice-data PBX line card. Radio telephone transmitter receiver 505 is connected to radio telephone transceiver 440 shown in FIG. 4 over a radio link. The multiplex voice and data signal emerges from transceiver 505 is connected to voice/data demultiplexer 520. A voice/data demultiplexer 520 separates voice and data back into separate paths and connects them respectively to PBX line card 530, which is serviced by the PBX. If a voice-only call should arrive over transceiver 505, an optional multiplexing detector would detect the absence of any multiplexing and close a path 515 around the voice data demultiplexer, permitting the voice to be utilized without any data and routed to the PBX. If voice and data are multiplexed, the voice/data demultiplexer will receive the multiplexed signals and demultiplex them into respective voice and data channels.

Figure 6:
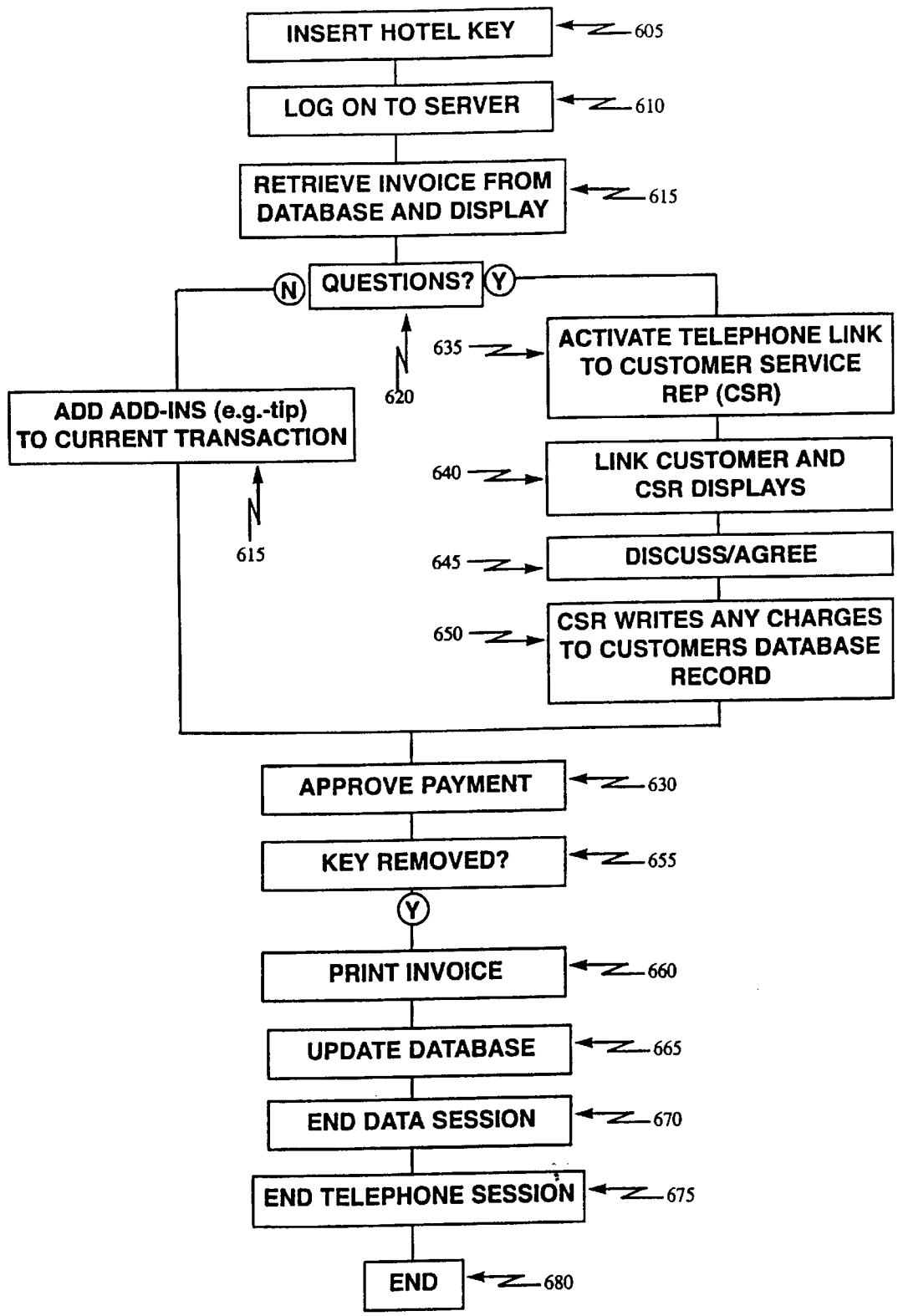
FIG. 6 is a flow chart of a process for using the system of FIG. 4 to review an invoice and resolve questions about the invoice.

FIG. 6 is a flow chart of a process for using a system of the invention to review an invoice and resolve questions about the invoice. A customer approaches a customer unit such as shown in FIG. 1 and inserts, in the case of the example, a magnetically encoded hotel key (605) which results in the user being logged on to server 325 shown in FIG. 3 (610) and the customer's hotel bill is retrieved from a data base on that server based on the key and the invoice is displayed. If a customer agrees with the bill (620-N), he can optionally add as it reflects changes up to that time and if the bill includes a bill for the current meal, a tip to the current transaction (625). When the customer is satisfied with the invoice, he approves payment (630). If a customer has questions about the invoice (620-Y), he picks up the telephone handset associated with the customer unit and a telephone link to the cashier is automatically established (635). When the cashier answers, and it becomes apparent that the customer's query concerns an invoice, the customer service representative can access the invoice records on server 325 user groupware software, so that both the customer service representative and the customer may see the same version of data on server 325. This linkage can also be automatically accomplished as part of the process of establishing a telephone link to the cashier so that when the cashier answers, the presence of call origination from one of terminals shown in FIG. 3, will automatically indicate that the invoice record should be automatically retrieved from the computer and provided to the customer service representative on their display screen.

Groupware software is well known in the art. In some forms, two or more individuals participate in and review a common document, each have an identical screen display of information relating to that document. This includes a groupware cursor, separate from the local screen cursor, which displays at the same location on leach of the screens participating in the groupware session. In a typical operational sequence, a customer desiring to illustrate changes or to call the group's attention to a portion of the document shown on the groupware display, would seize the groupware cursor by an action such as clicking upon the representation of the groupware cursor on the user's screen and dragging the cursor to the location desired while communicating with other participants in a conference call type of audio interaction. When the user is done with his comments and with the use of the groupware cursor, the customer relinquishes control of the groupware cursor so that it may be seized by another user. In the invention disclosed, a customer could control the groupware cursor by touching it and dragging his finger to the location of interest and removing his finger from the screen.

In this manner, the customer and the customer service representative may review the individual items in dispute on the customer's invoice and reach agreement as to how each is to be treated (645). When agreement is reached, the customer service representative writes any changes to the customer's data base record that have been agreed upon, the customer, reviewing the revised version, approves payment (630). At this point in time, the data base is updated (655) and, at the customer's direction, a printed version of the invoice (660) is generated on a printer and, when the customer's hotel key is removed (665), ending both the data session (670) and the telephone session (675 and 680). If the hotel key is not removed, after a certain period of time, the customer may have additional questions (620) and so the process loops back to that point.

In the kiosk embodiment, a copy of the final printed invoice is printed on the kiosk printer. In other embodiments, the guest would either pick up the printed invoice from the customer service representative (at the front desk in the example) or from a waiter or bartender who would retrieve the printed invoice from a printer in the immediate area.

The computer utilized at the customer service representative location would typically be a standard PC type device or a terminal for accessing the server. The components and bus structure of the customer representative computing device track very closely that shown in FIG. 2. Typically, a customer service representative would have a local printer available for printing invoices.

The novel features of this invention solve problems with current hotel billing and checkout procedures by empowering the guest to determine when his bill should be generated, by encouraging close and easy cooperation between the guest and the cashier should there be a billing dispute, and by allowing the guest to quickly authorize bill payment and print his final bill without having to wait for a cashier.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed is:

1. Apparatus for allowing a user to communicate with a customer service representative, comprising:
   a. a telephone handset;
   b. a computer, having a display, configured to retrieve a user's account information, display said account information for the user on said display, selectively permit the user to control a groupware cursor to call attention to a portion of the account information shown on said display to said customer service representative, and selectively permit said customer service representative to simultaneously see the same display information as that viewed by said user;
   c. a card reader; and
   d. an interface connecting said telephone handset, said computer and said card reader to a network.

2. Apparatus of claim 1 in which said interface connects said telephone handset to a cellular telephone.

3. Apparatus of claim 1 in which said interface connects said telephone handset to a cordless telephone.

4. Apparatus of claim 1 in which said interface connects said telephone handset to a radio transceiver.

5. Apparatus of claim 1 in which said interface connects audio information from said telephone handset and data from said computer to a voice/data multiplexer for transmission over said network.

6. Apparatus of claim 5 in which said interface includes an RF modem for sending data over an RF telephone channel.

7. Apparatus of claim 1 in which said display is a touch screen display.

8. Apparatus of claim 1 in which said card reader is a magnetic stripe reader.

9. A method of allowing a user to communicate with a customer service representative about a bill, comprising the steps of:
   a. providing an element for performing the step of reading an account identification from a medium;
   b. providing an element for performing the step of retrieving account information using said account identification;
   c. providing an element for performing the step of displaying said account information on a display of said user;
   d. providing an element for selectively permitting the user to control a groupware cursor to call attention to a portion of the account information shown on said display to said customer service representative; and
   e. providing a user activated element for performing the step of selectively automatically activating a voice link to said customer service representative, when said account information is displayed on a display of said user.

10. The method of claim 9 further comprising providing an element for performing the step of simultaneously displaying said account information on a display of said customer service representative.

11. The method of claim 10 further comprising the steps of providing an element for performing the step of revising said account information; and
   providing an element for performing the step of storing revised account information.

12. A method of allowing a user to communicate with a customer service representative, comprising the steps of:
   a. providing an element for performing the step of reading account identification information from an encoded medium assigned to said user;
   b. providing an element for performing the step of accessing a database to retrieve account information based on said account identification information;
   c. providing an element for performing the step of linking a terminal of said customer service representative and a terminal of said user to display the same information; and
   d. providing an element for performing the step of permitting the user to control a groupware cursor to call attention to a portion of the account information shown on said display to said customer service representative.

13. The method of claim 9 further comprising providing an element for performing the step of activating a voice link between said user and said customer service representative.

14. A system for allowing a user to communicate with a customer service representative, comprising:
   a. a network;
   b. a customer service representative terminal connected by a voice link and a data link to said network;
   c. a database accessible over said network; and
   d. one or more user terminals each providing a voice and data link to said network and each having a computer and card reader, said computer configured to obtain account identification from said card reader, to connect said user to said database to retrieve account information, to selectively permit the user to control a groupware cursor to call attention to a portion of the account information shown on said display to said customer service representative, and to selectively link said customer service representative terminal with said user terminal so both terminals display said account information.

15. The system of claim 14, in which at least one of said one or more users terminals is connected to said network over a cellular telephone link.

16. The system of claim 14, in which at least one of said one or more users terminals is connected to said network over a cordless telephone link.

17. The system of claim 14, in which at least one of said one or more users terminals is connected to said network over a radio link.

18. The system of claim 14, in which at least one of said one or more users terminals is installed in kiosk.

19. The system of claim 14, in which said network is an integrated voice and data PBX.

20. A computer program product allowing a user to communicate with a customer service representative comprising:
   a. a memory medium; and
   b. a computer program stored on said memory medium, said computer program including instructions for (1) reading an account identification from a medium assigned to said user; (2) retrieving account information using said account identification; (3) permitting the user to control a groupware cursor to call attention to a portion of the account information shown on said display to said customer service representative; and (4) displaying said account information on a display of said user and simultaneously on a display of said customer service representative.

21. The computer program of claim 20 in which said computer program further comprises instructions for activating a voice link between said customer service representative and said user.

22. The method of claim 9, in which said medium is a hotel key.

* * * * *